US008384760B2

(12) United States Patent
Tan

(10) Patent No.: US 8,384,760 B2
(45) Date of Patent: Feb. 26, 2013

(54) SYSTEMS FOR ESTABLISHING EYE CONTACT THROUGH A DISPLAY

(75) Inventor: Kar-Han Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 637 days.

(21) Appl. No.: 12/608,195

(22) Filed: Oct. 29, 2009

(65) Prior Publication Data

US 2011/0102538 A1     May 5, 2011

(51) Int. Cl.
*H04N 7/14*      (2006.01)
(52) U.S. Cl. .................................. 348/14.16; 348/14.01
(58) Field of Classification Search ............... 348/14.16, 348/14.01, 14.08
See application file for complete search history.

(56) References Cited

U.S. PATENT DOCUMENTS

| 7,336,294 | B2 * | 2/2008 | Kjesbu et al. ............... 348/14.16 |
| 2002/0063780 | A1 * | 5/2002 | Harman et al. ............... 348/211 |
| 2003/0218672 | A1 * | 11/2003 | Zhang et al. ............... 348/14.16 |
| 2004/0189794 | A1 * | 9/2004 | Rambo et al. ............... 348/14.16 |
| 2007/0002130 | A1 * | 1/2007 | Hartkop ..................... 348/14.16 |
| 2009/0278913 | A1 * | 11/2009 | Rosenfeld et al. ......... 348/14.16 |

OTHER PUBLICATIONS

Tan, Kar-Han et al., "ConnectBoard: A remote collaboration system that supports gaze-aware interaction and sharing", MMSP '09, 2009 IEEE, Oct. 5-7, 2009.

* cited by examiner

*Primary Examiner* — Stella Woo

(57) ABSTRACT

Various embodiments of the present invention are directed to video-conferencing systems configured and operated to create eye contact between video conference participants. In one embodiment, video conferencing system includes a display, a video camera positioned to capture a video image of a first video conference participant through the display, and a projector positioned to project a video image of a second video conference participant onto the display screen such that the first participant can view the second participant. The display screen is positioned between the first participant and the video camera. The video camera and the projector can be operated during a video conference to establish eye contact between the first participant and the second participant by creating a line-of-sight that passes through a point of the head of the second participant's image between the video camera and the first participant.

20 Claims, 10 Drawing Sheets

SYSTEMS FOR ESTABLISHING EYE CONTACT THROUGH A DISPLAY

TECHNICAL FIELD

Embodiments of the present invention relate to video-conferencing technology.

BACKGROUND

In recent years, individuals and businesses have begun using video-conferencing technologies to increase efficiency and productivity. In particular, video-conferencing technologies allow people at a first location to simultaneously converse with people at other locations in nearly real time, without wearing headsets or using handheld communication devices. Video conferencing can be as simple as a conversation between two people in different locations (point-to-point) or involve several locations (multi-point) with more than one person at each location. Video-conference communication is becoming more affordable to a wide range of users including individuals and businesses, because high-speed Internet connectivity has become more widely available at a reasonable cost, and because the hardware used for this technology has continued to improve in quality at ever lower costs.

However, many video-conferencing technology users argue that a number of issues prevent current video-conferencing technology from becoming a standard part of communication. One major issue is lack of eye contact, which plays a major role in conversational communications, perceived attention and intent, and other important aspects of natural face-to-face communication. For example, consider a first person and a second person participating in a video conference. When the first person looks at a display screen of the second person, the first person is not looking at the camera, resulting in the second person getting a view of the first person without eye contact. On the other hand, when the first person looks at the camera, the first person at best gets a peripheral view of the second person exhibited on the display. Thus, typical video-conferencing technologies are arguably worse than traditional audio conferencing technologies that provide no eye contact cues, because typical video-conferencing technologies create the false impression that participants are either avoiding eye contact or are distracted.

Designers and users of video-conference technologies continue to seek improvements to the video-conferencing experience.

DETAILED DESCRIPTION

Various embodiments of the present invention are directed to video-conferencing systems configured and operated to create eye contact between video conference participants. In particular, embodiments of the present invention include a sec-through display screen allowing one or more cameras to be placed behind the display screen and out of site of a local participant. Eye contact can be created between the local participant viewing the display screen and a remote participant projected onto the display screen by (1) shifting the image of the remote participant into eye contact with the local participant; (2) shifting the line-of-sight of the camera into alignment with the remote participant's head so that the local participant is looking into the lens of the camera enabling the establishment of eye contact with the remote participant; or (3) having an array of cameras located behind the display, where the camera nearest a line-of-sight of the local participant that also passes through the remote participant is activated, or views from two or more cameras of the array of cameras are used to synthesize a virtual camera lying on the line-of-sight passing through the local participant and the image of the remote participant.

Figure 1:
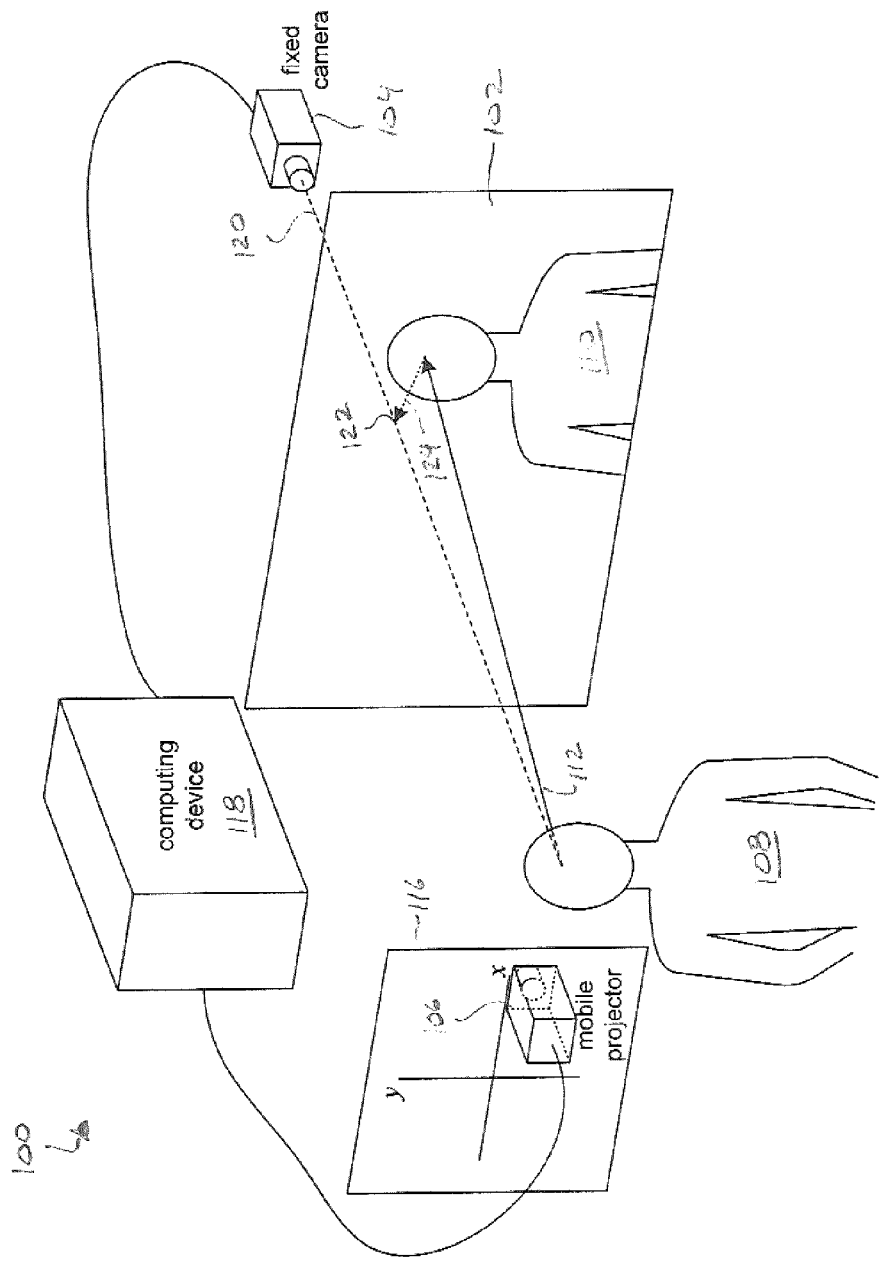
FIG. 1 shows an example of a first video-conferencing system configured in accordance with embodiments of the present invention.

FIG. 1 shows an example of a video-conferencing system 100 configured in accordance with embodiments of the present invention. The conferencing system 100 includes a display screen 102, a fixed video camera 104, and a mobile projector 106. The display screen 102 can be a front projection screen configured as described in U.S. patent application "Systems for Capturing Images Through a Display," filed Apr. 29, 2009, U.S. Ser. No. 12/432,550, incorporated herein by reference. The projector 106 is positioned to project video images onto the display screen 102 from above and/or behind the first participant 108, enabling the first participant 108 to see a second video conference participant 110 projected onto the display screen 102 without substantially seeing the camera 104 located behind the display screen 102. The display screen 102 is also configured to enable the camera 104 to capture images of objects through the display screen 102. Directional arrow 112 identifies a straight line, called a line-of-sight ("LOS"), along which the first participant looks at the second participant exhibited on the display screen 102. Dashed line 120 identified the LOS of the camera 120 which is directed to the face of the first participant 108. However, the LOS 112 is not directed to the lens of the camera 104. Thus, eye contact is not established between the first participant 108 and the second participant 110.

As shown in the example of FIG. 1, the mobile projector 106 is mechanically coupled to a mechanized platform 116, which can be used to dynamically reposition the projector 106 during a video conference and in turn reposition the image of the second participant 110 within the display screen 102. FIG. 1 includes x- and y-coordinate axes that can be used as reference axes to identify a change in position of the projector 106. The camera 104, projector 106, and mechanized platform 116 are in electronic communication with a computing device 118, described below with reference to FIG. 10.

Camera 104 captures video images of the first participant 108. The video images are sent to the computing device 118 for image processing, and the projector 106 projects video images received from the computing device 118 of the second participant onto the display screen 102. The computing device 118 can use well-known facial recognition/detection algorithms to determine an approximate coordinate location of the center of the first participant's 108 face or head and determine an approximate coordinate location of the center of the second participant's 110 face or head. Based on the coordinate locations of the participant's heads, the computing device 118 can be used to determine a point 122 where the LOS 120 of the camera 104 passes through the display screen 102 and uses the mechanized platform 116 to reposition of the projector 106 to project the second participant 110 such that approximate center of the second participant's face or head matches the point 122, as indicated by directional arrow 124.

Figure 2:
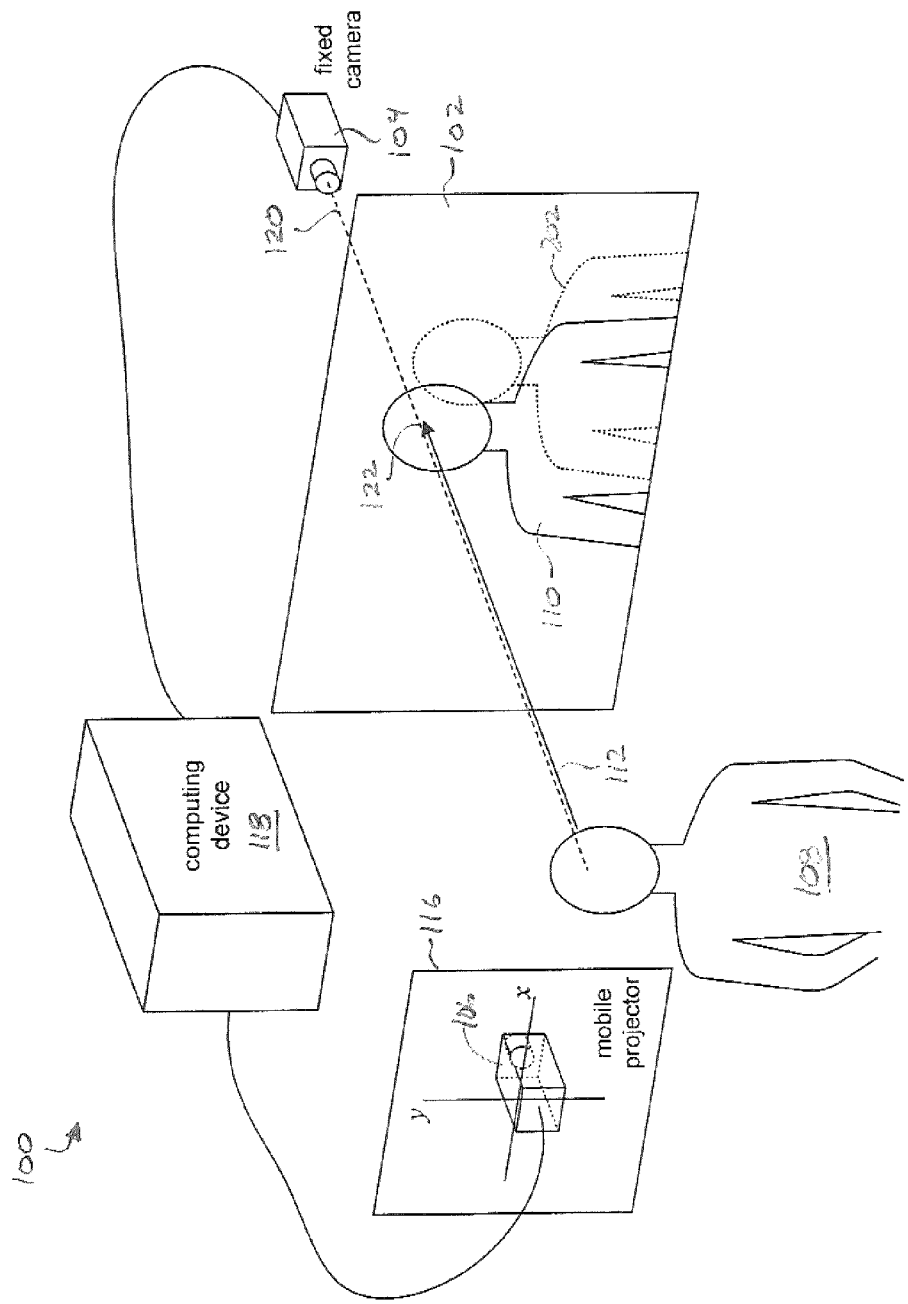
FIG. 2 shows an example of the video conferencing system shown in FIG. 1 with a projector repositioned in accordance with embodiments of the present invention.

FIG. 2 shows the video conferencing system 100 with the projector 106 repositioned in accordance with embodiments of the present invention. As shown in the example of FIG. 2, the projector 106 is repositioned such that the center of the second participant's 110 head substantially intersects the point 122. Dashed line FIG. 202 represents the previous position of the second participant shown in FIG. 1. Note that as a result of repositioning the image of the second participant 110, the LOS 112 of the first participant 108 is reoriented into approximate alignment with the LOS 120. In other words, the first participant 108 looks at the face of the second participant 110 and looks into the lens of the camera 104, creating for the second participant 110 the appearance of the first participant 108 looking at the face of the second participant 110 through the second participant's display. When the second participant 110 looks into a camera creating the second participant's image on the display screen 102 at the second participant's location, the second participant 110 appears to be looking at the face of the first participant 108 through the display screen 102. As a result, the first and second participants can experience a face-to-face video conference with eye contact.

Figure 3:
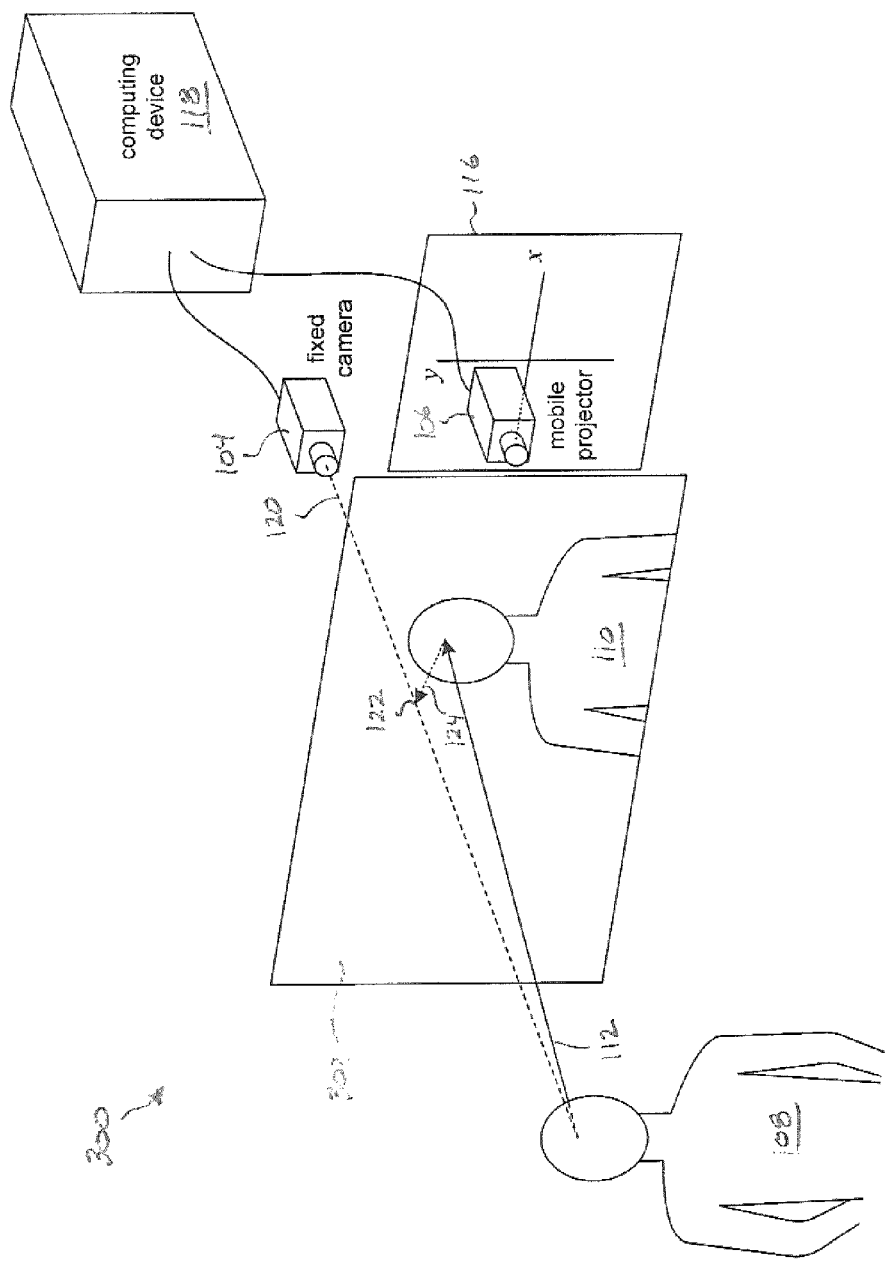
FIG. 3 shows an example of a second video conferencing system configured in accordance with embodiments of the present invention.

Embodiments of the present invention are not limited to video conferencing system with the projector positioned to project the image of the second participant from behind the first participant as shown in FIG. 1. In other embodiments, the display screen 102 can be replaced by a rear projection display described in U.S. patent application "Systems for Capturing Images Through a Display," filed Jan. 28, 2009, U.S. Ser. No. 12/321,996, incorporated herein by reference. FIG. 3 shows an example of a video conferencing system 300 that is nearly identical to the video conferencing system 100 except the video display screen 102 is replaced by a rear projection display screen 302 and the mobile projector 106 and mechanized platform 116 are mounted behind the display screen 302 opposite the first participant. The video conferencing system 300 is operated in the same manner as the video conferencing system 100 by repositioning the projector 106 to change the projected position of the second participant.

Figure 4:
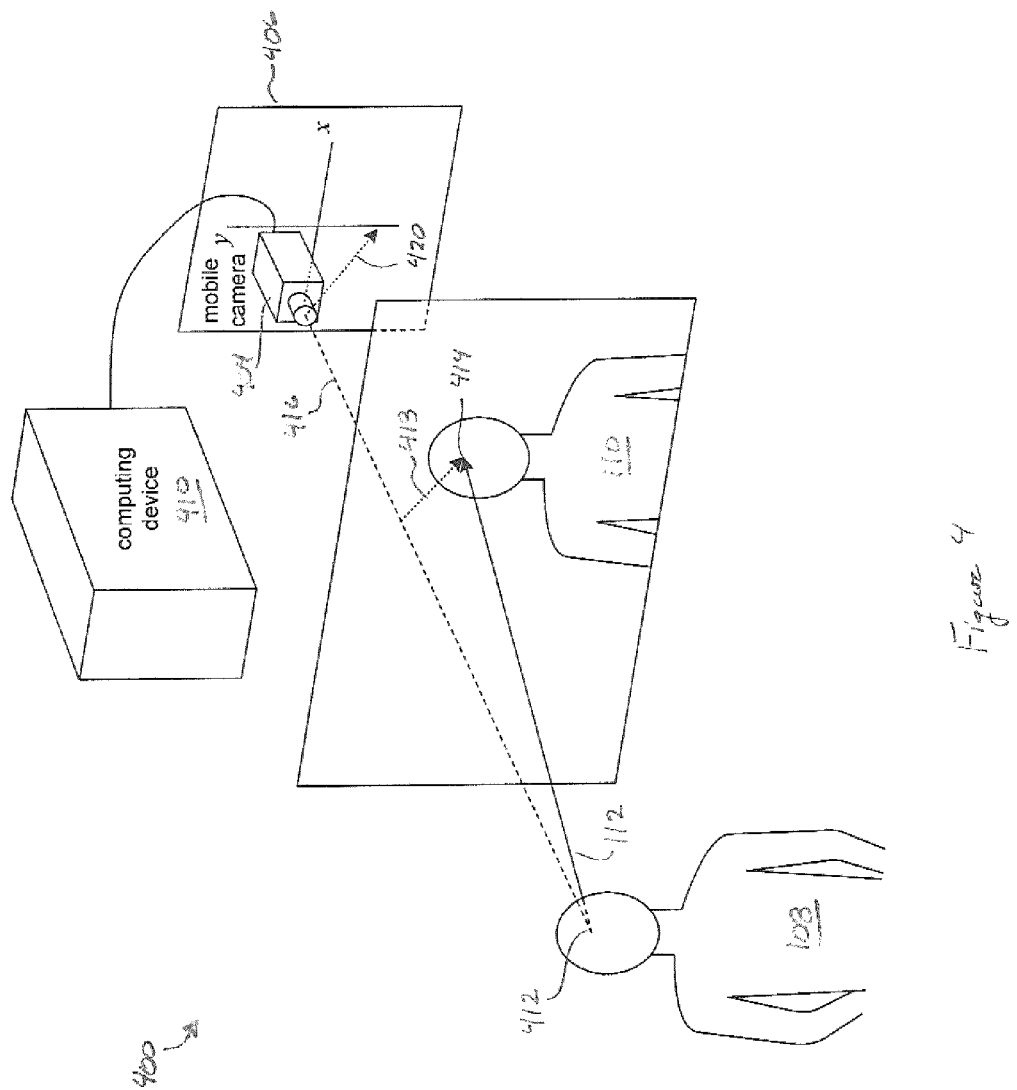
FIG. 4 shows an example of a third video conferencing system configured in accordance with embodiments of the present invention.

FIG. 4 shows an example of a video conferencing system 400 configured and operated in accordance with embodiments of the present invention. The conferencing system 400 includes a display screen 402, a mobile video camera 404 mechanically coupled to a mechanical platform 406, a fixed position projector (not shown). In certain embodiments, the projector can be mounted above and/or behind the first participant 108, and the display screen can be a front projection screen configured as described above with reference to FIG. 1. In other embodiments, the display screen 402 can be a rear projection display screen with a fixed projector mounted behind the display screen 402 opposite the first participant 108, as described above with reference to FIG. 3. As described above with reference to FIG. 1, LOS 112 identifies a straight line along which the first participant 108 looks at the second participant 110 exhibited on the display screen 102, which is not aligned with the LOS 416 of the camera 104. Thus, eye contact is not established between the first participant 108 and the second participant 110.

The camera 404, mechanized platform 406, and projector (not shown) are in electronic communication with a computing device 410, as described below with reference to FIG. 10. The mechanized platform 406 can be used to dynamically reposition the camera 404 during a video conference within the plane of the mechanized platform, identified be x- and y-coordinate axes, and reorient the direction of the camera 404 is pointing.

Camera 404 captures video images of the first participant 108 through the display screen 402. The images are sent to the computing device 410 for image processing. On the other hand, the projector projects images of the second participant 110 received from the computing device 410 onto the display screen 102. The computing device 410 can use well-known facial recognition/detection algorithms to determine an approximate coordinate location 412 of the center of the first participant's 108 face or head and determine an approximate coordinate location 414 of the center of the second participant's face or head projected onto the display screen 102. Based on the coordinate locations 412 and 414, the computing device 410 uses the mechanized platform 406 to reposition and reorient of the camera 404 such that the LOS 416 of the camera 404 is substantially aligned with the LOS 112, as indicated by directional arrows 418 and 420.

Figure 5:
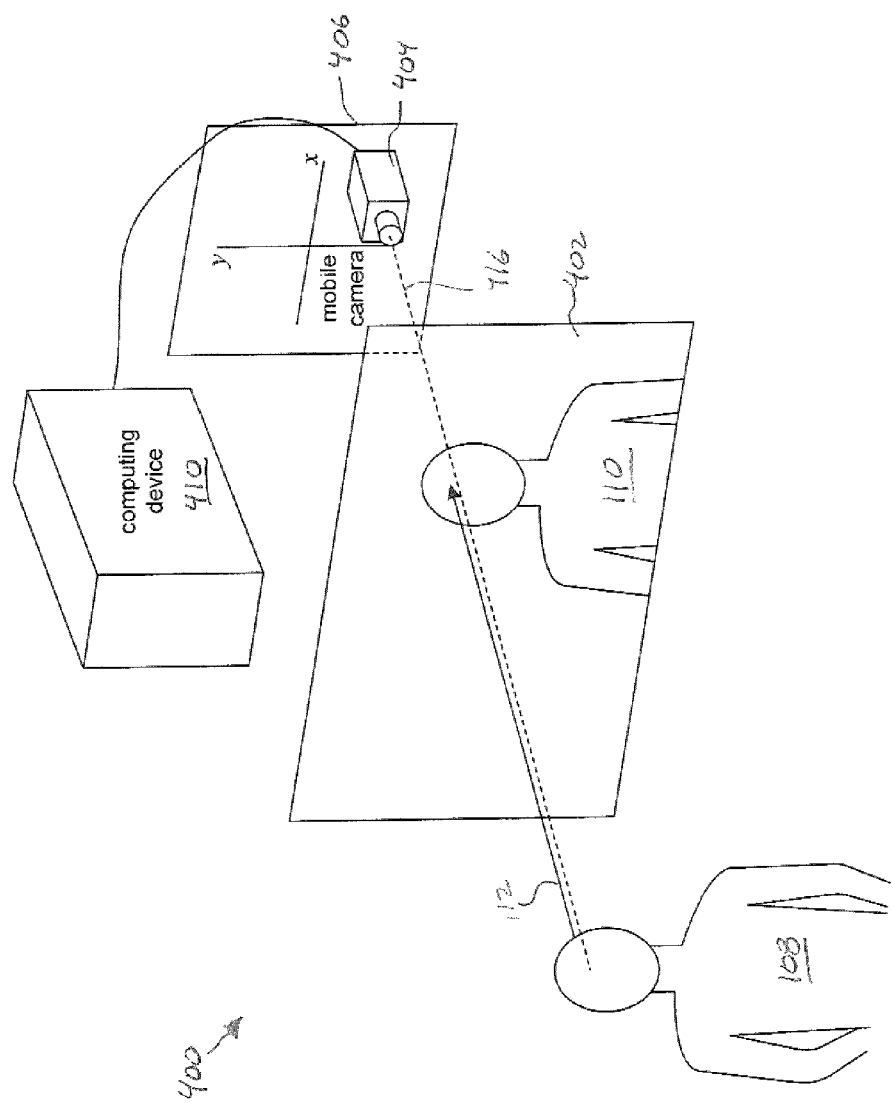
FIG. 5 shows an example of the video conferencing system shown in FIG. 4 with a camera repositioned and reoriented in accordance with embodiments of the present invention.

FIG. 5 shows the video conferencing system 400 with the camera 404 repositioned and reoriented in accordance with embodiments of the present invention. As shown in the example of FIG. 5, the camera 404 is repositioned and reoriented such that the LOS 416 of the camera 406 is substantially aligned with the LOS 112 of the first participant 112 and passes through the center of the second participant's 110 head. Note that by repositioning and reorienting the camera 404, the first participant 108 is looking at the face of the second participant 110 and is looking into the lens of the camera 404, creating for the second participant 110 the appearance of the first participant 108 looking at the face of the second participant 110. When the second participant 110 looks into a camera creating the second participant's image on the display screen 402 at the second participant's location, the second participant 110 appears to be looking at the face of the first participant 108 through the display screen 102. As a result, the first and second participants can experience a face-to-face video conference with eye contact.

Note that embodiments of the present invention are not limited exclusively to moving just the projector, as described above with reference to FIGS. 1-3, or limited exclusively to moving just the camera, as described above with reference to FIGS. 4-5. In other embodiments, video conferencing systems can be composed of both movable projectors and moveable cameras. In other words, the moveable projectors of the systems 100 and 300 can be combined with the moveable cameras of the system 400 to produce video conferencing systems that substantially align the LOS of the camera with the LOS of the first participant to pass through the face of the second participant.

Note that embodiments of the present invention are not limited to moving just the projector and/or the camera to substantially align the LOS of the camera with the LOS of the first participant to pass through the face of the second participant. In other embodiments, the lens or focusing systems of the projector and/or camera can be moved or shifted to provide fine adjustments that substantially optimize alignment of the LOS of the camera with the LOS of the first participant to pass through the face of the second participant display on the display screen.

In still other embodiments, rather than using mechanical means to shift the image captured by the camera and/or the image projected by the projector, the collected images from the camera and the images projected by the projector can be electronically processed by the computing device so that the LOS of the camera and the LOS of the first participant appear substantially aligned and pass through the face of the second participant. For example, the image of the second participant projected onto the display screen can be electronically processed by the computing device such that second participant is repositioned within the display screen with the second participant's head located such that the LOS of the camera and the LOS of the first participant are substantially aligned and pass through the face of the second participant.

Figure 6:
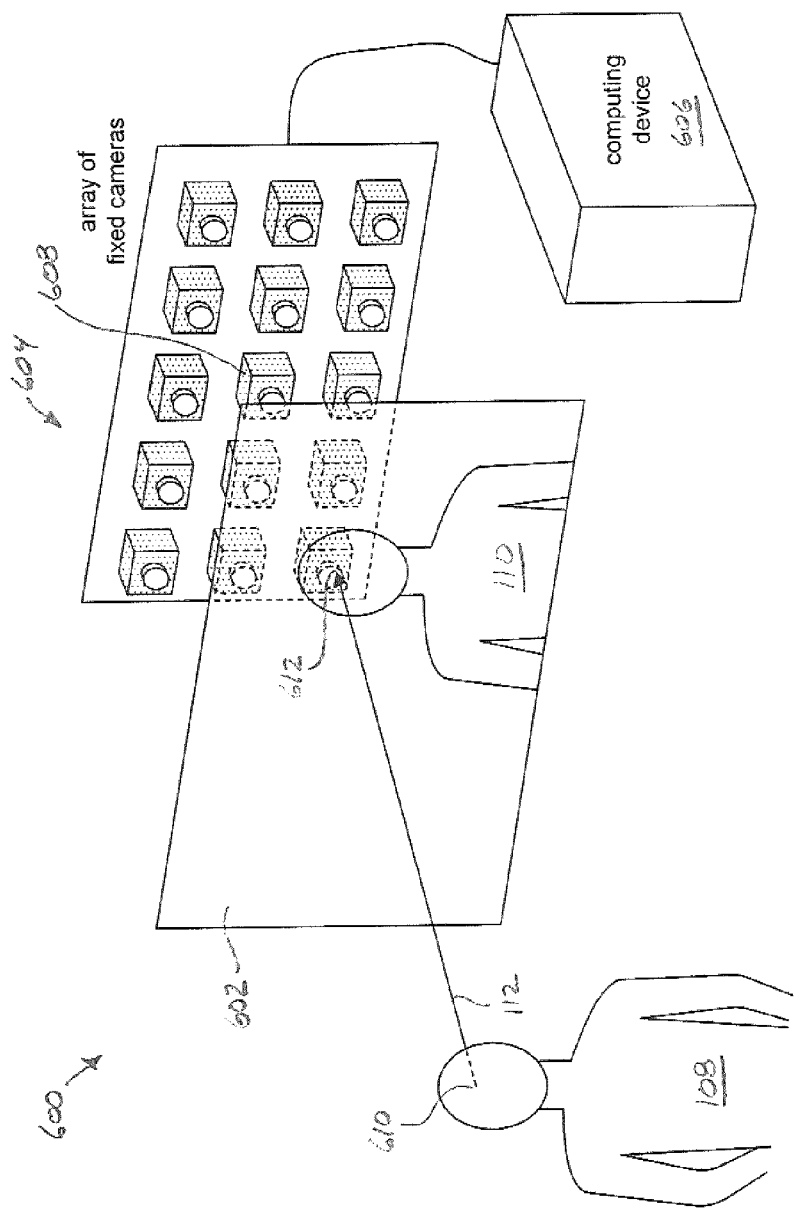
FIG. 6 shows an example of a fourth video conferencing system configured and operated in accordance with embodiments of the present invention.

FIG. 6 shows an example of a video conferencing system 600 configured and operated in accordance with embodiments of the present invention. The conferencing system 400 includes a display screen 602, an array of fixed video cameras 604, and a fixed position projector (not shown). In certain embodiments, the projector can be mounted above and/or behind the first participant 108 and the display screen 602 as described above with reference to FIG. 1. In other embodiments, the display screen 602 can be a rear projection display screen with a fixed projector mounted behind the display screen 602 opposite the first participant 108, as described above with reference to FIG. 3.

When the video conference begins, one camera, such as centrally located camera 608, can be used to initially capture video images of the first participant 108, which are sent to the computing device 606 for image processing, and the projector projects images received from the computing device 606 of the second participant 110 onto the display screen 102. The computing device 606 can use well-known facial recognition/detection algorithms to determine an approximate coordinate location 610 of the center of the first participant's 108 face or head and determine an approximate coordinate location 612 of the center of the second participant's face or head projected onto the display screen 602. Based on the coordinate locations 610 and 612, the computing device 606 can be used to determine the line of sight 112.

Figure 7:
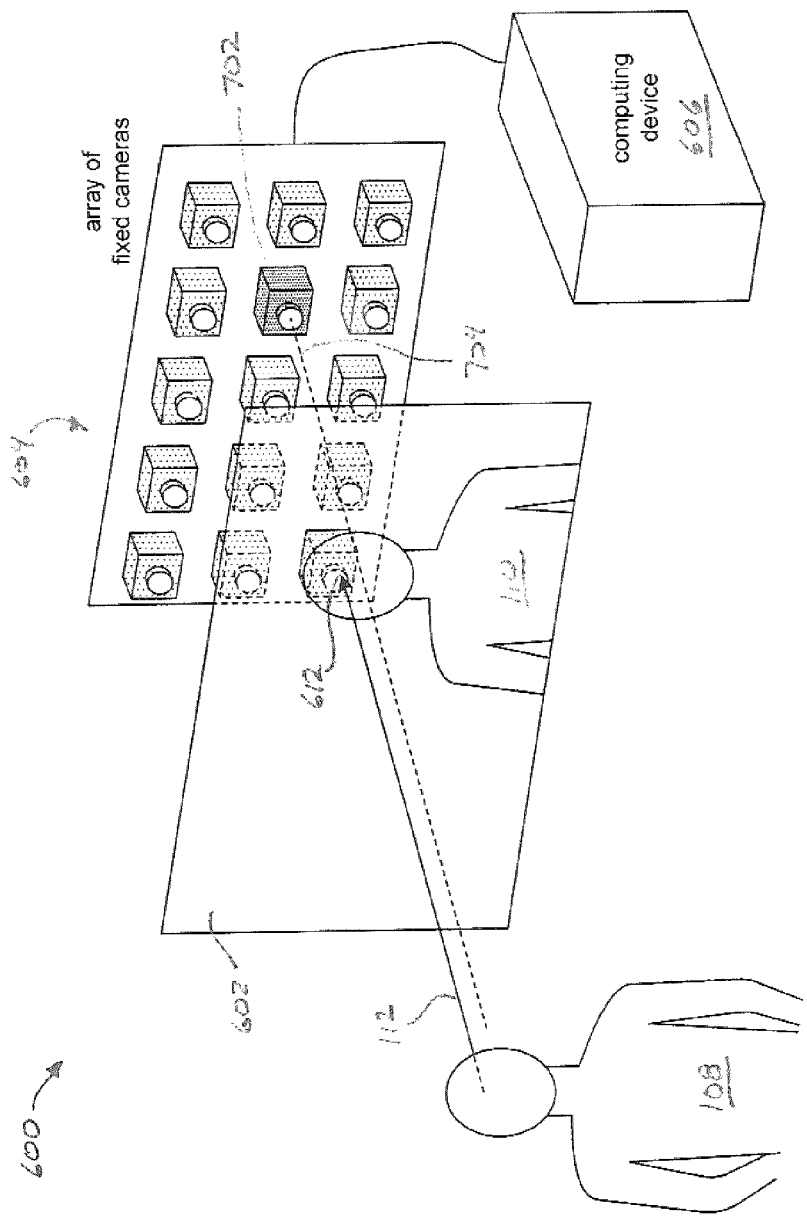
FIG. 7 shows an example of a single camera of an array of cameras of the video conferencing system shown in FIG. 6 activated in accordance with embodiments of the present invention.

In certain embodiments, once the LOS 112 has been determined, the computing device 606 activates a camera with a LOS closely aligned with the LOS 112, passes the approximate center of the second participant face, and enables the first participants to look into the lens of the activated camera. FIG. 7 shows a camera 702 of the array of cameras 604 activated in accordance with embodiments of the present invention. The camera 702 has a LOS 704 closely aligned with the direction 112 and substantially passes through the point 612 of the second participant's head. The video images provided by the camera 702 can then be used to track movements of the first participant 108 such that when the first participant 108 changes position during the course of the video conference the direction of the LOS 112 also changes. The computing device 606 responds to changes in the LOS 112 by activating a different camera in the array of cameras 604 in order to provide video images of the first participant 108 from a camera with a LOS closely aligned with the new direction of the LOS 112.

Figure 8:
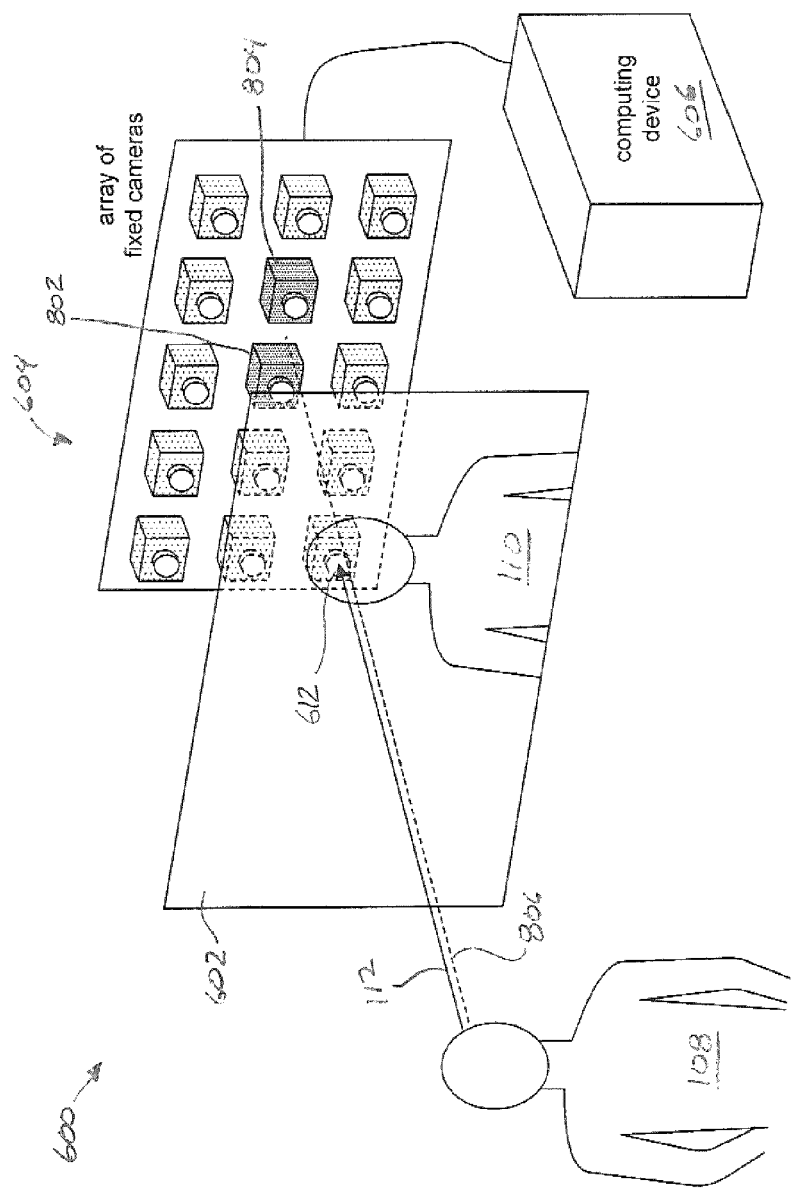
FIG. 8 shows an example of two cameras of the array of cameras of the video conferencing system shown in FIG. 6 activated in accordance with embodiments of the present invention.

In other embodiments, once the LOS 112 has been determined, the computing device 606 can activate two or more cameras and perform view synthesis to create an artificial LOS with a direction substantially aligned with the LOS 112. FIG. 8 shows two cameras 802 and 804 of the array of cameras 604 activated in accordance with embodiments of the present invention. The cameras 802 and 804 each capture a different video image of the first participant 108 that are sent to the computing device 606. The computing device 606 performs view synthesis to create a single image of the first participant 108 that is sent to the second participant 110. The synthesized image corresponds to a virtual camera located somewhere between the cameras 802 and 804 and has a LOS 806 that passes through the point 612 of the second participant's head. The synthesized image can also be used to track movements of the first participant 108 such that when the first participant 108 changes position during the course of the video conference the direction of the LOS 112 also changes. The computing device 606 responds to changes in the LOS 112 by activating to a particular camera, or by activating two or more cameras to generate a synthesized image, in order to provide video images of the first participant 108 with a LOS substantially aligned with the new direction of the LOS 112.

Embodiments are not limit to a two-dimensional regularly spaced array of video cameras as described above with reference to the video conference system 600 shown in FIGS. 6-8. In other embodiments, the array of video camera can be a one-dimensional array of video cameras. In still other embodiments, the array 604 can be replaced by a plurality of irregularly spaced video cameras may, or cameras clustered in locations corresponding to where the first participant is most likely to be positioned in front of the display screen 602. In other words, the plurality of cameras do not have to regularly spaced to perform the operations described above with reference to the video conference system 600.

In still other embodiments, the projector (not shown) can be mounted on a mechanized platform, as described above with reference to FIGS. 1 and 3. Once the LOS 112 has been determined, the computing device 606 can reposition the projector, as described above with reference to FIGS. 1 and 3, so that the image of the second participant 110 is placed within the display screen 602 with the LOS of the nearest camera of the array of cameras 604 passing through the point 612 and is substantially aligned with the LOS of the first participant 108 to the second participant 110.

In still other embodiments, each of the plurality of cameras can be mechanically coupled to a mechanized platform enabling each camera to be independently moved. In still other embodiments, the lens of each cameras and the focusing system of the projector can be moved or shifted so that the LOS of one or more activated cameras can be aligned with the LOS of the first participant and to pass through the face of the second participant Note that by activating the appropriate one or more cameras of the array of cameras 604, the first participant 108 looks at the face of the second participant 110 and looks into the lens of one camera or the lens of a virtual camera, creating for the second participant 110 the appearance of the first participant 108 looking at the face of the second participant 110. When the second participant 110 looks into the camera creating the second participant's image on the display screen 602 at the second participant's location, the first participant 108 has the impression of the second participant 110 looking at the face of the first participant 108 through the display screen 102. As a result, the first and second participants can experience a face-to-face video conference with eye contact.

In order to limit capturing of images to within the boundaries of the displays described above, the video conferencing systems may also include a housing (not shown) enclosing the camera, or enclosing the camera and the projector, depending on the type of display screen used. The housing can be configured with an opening enclosing the boundaries of the display screen and is configured so that light can only enter and exit the housing through the display.

Figure 9:
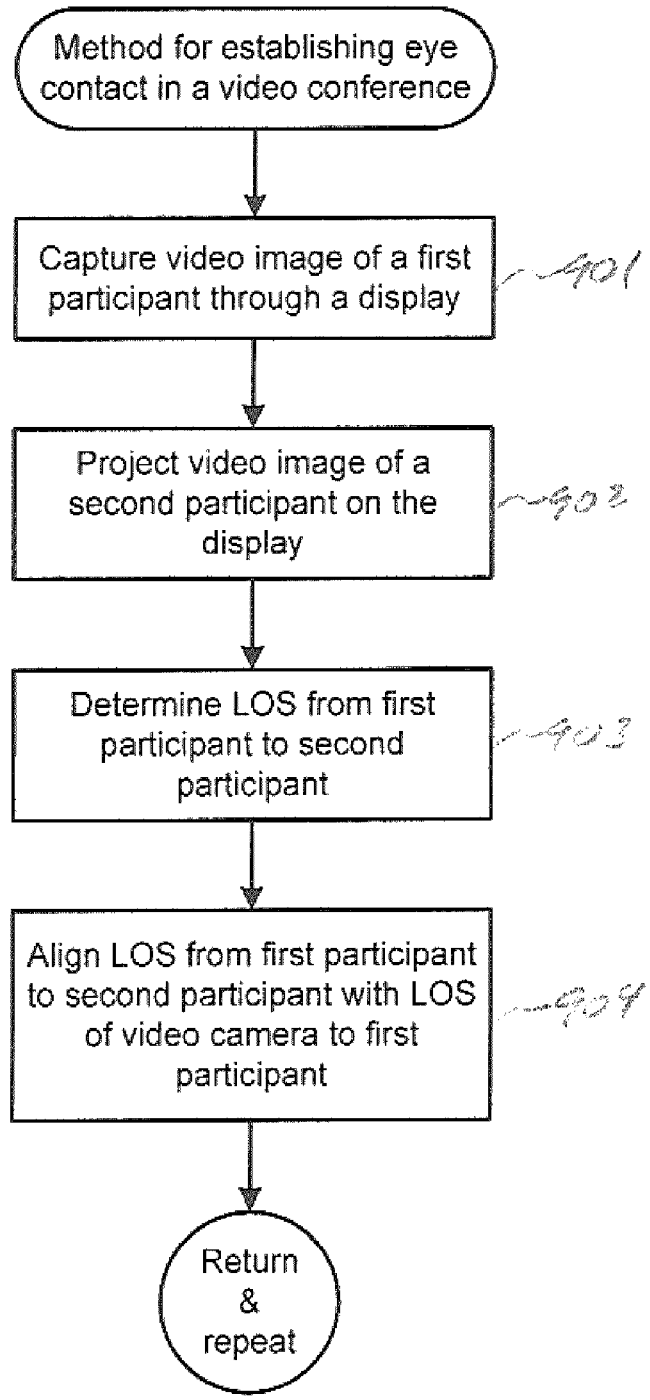
FIG. 9 shows a control-flow diagram of a method for establishing eye contact between participants in a video conference in accordance with embodiments of the present invention.

FIG. 9 shows a control-flow diagram of a method for establishing eye contact between participants in a video conference in accordance with embodiments of the present invention. In step 901, a video image of a first video conference participant is captured through a display screen using a video camera. As described above with reference to FIGS. 1-8, the display screen is positioned between the video camera and the first participant. In step 902, a video image of a second video conference participant is projected onto the display screen using a projector, as described above with reference to FIGS. 1-3. The second participant is projected so that the first participant can view the second participant on the display. In step 903, a LOS directed from an approximate center position of the first participant's face or head to an approximate center point of the projected image of the second participant's face or head is determined. In this step, facial recognition/detection algorithms can be used to identify the shape and surface areas of the first and second participants' faces. A first point corresponding to the center of the first participant's face and a second point corresponding to the center of the second participant's face can be used to construct a vector corresponding to the LOS from the first participant to the second participant. In step 904, the LOS from the first participant to the second participant can be aligned with the LOS from the camera to the first participant by (1) shifting the image of the second participant into eye contact with the first participant, as described above with reference to FIGS. 1-3; (2) shifting the line-of-sight of the camera into alignment with the second participant's face or head so that the first participant is looking into the lens of the camera establishing eye contact with the remote participant, as described above with reference to FIGS. 4-5; and (3) having an array of cameras located behind the display, where one or more cameras are used to established eye contact between the first participant and the second participant, as described above with reference to FIGS. 6-8.

In general, system and methods for establishing eye contact between participants in a video conference are described above with reference to a computing device. The computing device can be a desktop computer, a laptop, or any other suitable device configured to carry out video and image processing. For convenience sake, the computing device is described above, and is shown in FIGS. 1-8, as a separate component of the video conferencing system. However, embodiments of the present invention are not so limited. In other embodiments, the video processing performed by the computing devices described above may also be performed by the projector, or the video processing can be performed by the camera.

Figure 10:
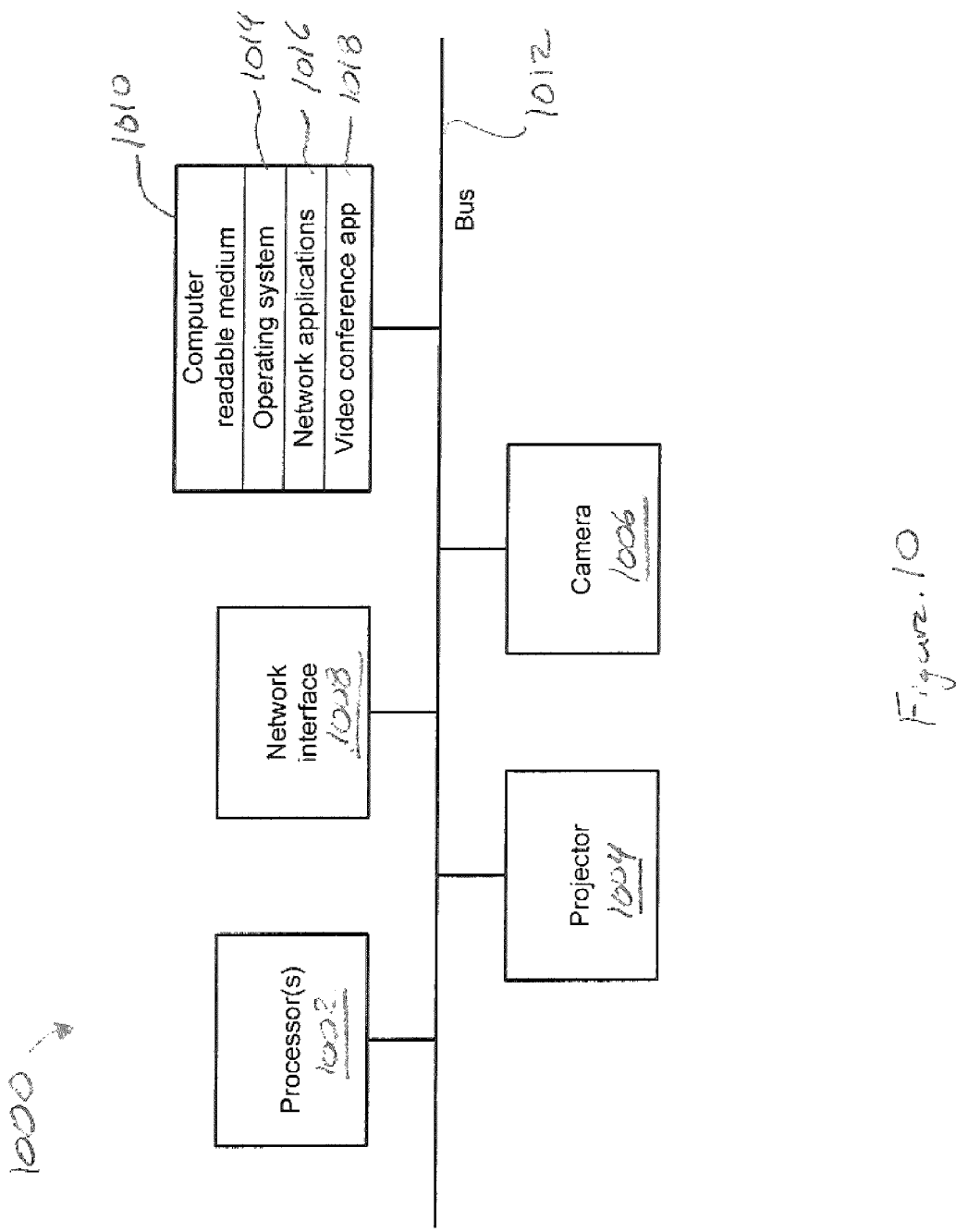
FIG. 10 shows a schematic representation of a computing device configured in accordance with embodiments of the present invention.

FIG. 10 shows a schematic representation of a computing device 1000 configured in accordance with embodiments of the present invention. The device 1000 may include one or more processors 1002, such as a central processing unit; a video projector 1004; a video camera 1006; one or more network interfaces 1008, such as a Local Area Network LAN, a wireless 802.11x LAN, a 3G mobile WAN or a WiMax WAN; and one or more computer-readable mediums 1010. Each of these components is operatively coupled to one or more buses 1012. For example, the bus 1012 can be an EISA, a PCI, a USB, a FireWire, a NuBus, or a PDS.

The computer readable medium 1010 can be any suitable medium that participates in providing instructions to the processor 1002 for execution. For example, the computer readable medium 1010 can be non-volatile media, such as firmware, an optical disk, a magnetic disk, or a magnetic disk drive; volatile media, such as memory; and transmission media, such as coaxial cables, copper wire, and fiber optics. The computer readable medium 1010 can also store other software applications, including word processors, browsers, email, Instant Messaging, media players, and telephony software.

The computer-readable medium 1010 may also store an operating system 1014, such as Mac OS, MS Windows, Unix, or Linux; network applications 1016; and a video conferencing application 1018. The operating system 1014 can be multi-user, multiprocessing, multitasking, multithreading, real-time and the like. The operating system 1014 can also perform basic tasks such as recognizing input from input devices, such as a keyboard, a keypad, or a mouse; sending output to the projector 1004 and the camera 1006; keeping track of files and directories on medium 1010; controlling peripheral devices, such as disk drives, printers, image capture device; and managing traffic on the one or more buses 1012. The network applications 1016 includes various components for establishing and maintaining network connections, such as software for implementing communication protocols including TCP/IP, HTTP, Ethernet, USB, and FireWire.

A video conference application 1018 provides various software components for established eye contact between video conference participants, as described above. In certain embodiments, some or all of the processes performed by the application 1018 can be integrated into the operating system 1014. In certain embodiments, the processes can be at least partially implemented in digital electronic circuitry, or in computer hardware, firmware, software, or in any combination thereof.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A video conferencing system comprising:
a display;
a video camera positioned to capture a video image of a first video conference participant through the display, the display screen positioned between the first participant and the video camera;
a projector positioned to project a video image of a second video conference participant onto the display screen such that the first participant can view the second participant; and a computing device to operate at least one of the video camera and the projector during a video conference to establish eye contact between the first participant and the second participant by detecting the first participant's face in the video image captured by the video camera and creating a line-of-sight from the video camera to the first participant's face that passes through a point in the second participant's head in the second participant's image.

2. The system of claim 1 wherein the display screen further comprises a front projection display screen configured so that images projected onto the display screen can be viewed by the first participant and images of the first participant can be captured through the display screen by the video camera.

3. The system of claim 1 wherein the display screen further comprises a rear projection display screen located between the projector and the first participant, the rear projection display screen configured so that images projected onto the display screen can be viewed by the first participant and images of the first participant can be captured through the display screen by the video camera.

4. The system of claim 1 further comprising a mechanized platform mechanically coupled to the projector, wherein the mechanized platform is configured to reposition the projector such that the image of the second participant is repositioned on the display screen so that the first participant looks at the face of the second participant and looks into the lens of the video camera.

5. The system of claim 4 wherein the video camera further comprises a fixed position video camera.

6. The system of claim 1 further comprising a mechanized platform mechanically coupled to the video camera, wherein the mechanized platform is configured to reposition and reorient the camera such that the first participant looks at the face of the second participant's image and looks into the lens of the video camera.

7. The system of claim 6 wherein the projector further comprise a fixed position projector.

8. The system of claim 1 further comprising:
a first mechanized platform mechanically coupled to the projector; and
a second mechanized platform mechanically coupled to the video camera, wherein the first and second mechanized platforms are configured to reposition and reorient the projector and the camera such that the first participant looks at the face of the second participant's image and looks into the lens of the video camera.

9. The system of claim 1 wherein the video camera is configured and operated so that the camera lens can be shifted to substantially optimize the field of view of the camera wherein the line-of-sight from the video camera to the first participant's face is substantially aligned with a line-of-sight from the first participant's face to the second participant's head in the second participant's image.

10. The system of claim 1 wherein the projector is configured so that the projector lens can be shifted to substantially optimize the projected image of the second participant within the display screen such that the line-of-sight from the video camera to the first participant's face is substantially aligned with a line-of-sight from the first participant's face to the second participant's head in the second participant's image.

11. The system of claim 1 wherein the video camera further comprises an activated video camera of a plurality of video cameras.

12. The system of claim 1 wherein the video camera further comprises a virtual video camera created by view synthesis of two or more video images of the first participant obtained by two or more video cameras of a plurality of video cameras.

13. A method for establishing eye contact between participants in a video conference comprising:
capturing a video image of a first video conference participant through a display screen using a video camera, the display screen positioned between the first participant and the video camera;
projecting a video image of a second video conference participant on the display screen using a projector, wherein the first participant can view the second participant;
detecting the first participant's face in the video image captured by the video camera using a computing device; and
aligning a line-of-sight from the video camera to the first participant's face with a line-of-sight from the first participant to the second participant in the second participant's image using the computing device to establish eye contact between the first participant and the second participant.

14. The method of claim 13 further comprising:
aligning the line-of-sight from the video camera to the first participant's face with the line-of-sight from the first participant to the second participant in the second participant's image using the computing device by repositioning the projector.

15. The method of claim 13 further comprising:
aligning the line-of-sight from the video camera to the first participant's face with the line-of-sight from the first participant to the second participant in the second participant's image using the computing device by repositioning and reorienting the video camera.

16. The method of claim 13 wherein capturing the video image of the first participant further comprises activating one or more video cameras of a plurality of video cameras.

17. The method of claim 13 wherein detecting the first participant's face further comprises determining a center point of the first participant's face or head based on the video image of first participant.

18. The method of claim 13 wherein aligning the line-of-sight from the video camera to the first participant's face with the line-of-sight from the first participant to the second participant in the second participant's image using the computing device causes the line-of-sight from the video camera to the first participant's face to pass through a point in the second participant's head the second participant's image.

19. The method of claim 13 further comprising:
detecting the second participant's face in the video image of the second participant projected onto the display screen using the computing device; and
determining the line-of-sight from the first participant to the second participant in the second participant's image using the second participant's face detected in the video image of the second participant using the computing device.

20. The method of claim 13 further comprising:
determining the line-of-sight from the video camera to the first participant's face using the first participant's face detected in the video image captured by the video camera using the computing device.

* * * * *